United States Patent
Kang et al.

(10) Patent No.: US 10,565,447 B2
(45) Date of Patent: Feb. 18, 2020

(54) IMAGE SENSOR AND ELECTRONIC APPARATUS INCLUDING THE SAME

(71) Applicant: SAMSUNG ELECTRONICS CO., LTD., Suwon-si (KR)

(72) Inventors: Se Hyeon Kang, Hwaseong-si (KR); Dong Wook Won, Hwaseong-si (KR); Seog Heon Ham, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/866,041

(22) Filed: Jan. 9, 2018

(65) Prior Publication Data
US 2018/0349697 A1 Dec. 6, 2018

(30) Foreign Application Priority Data
Jun. 5, 2017 (KR) .......... 10-2017-0069566

(51) Int. Cl.
| | | |
|---|---|---|
| G06K 9/00 | (2006.01) | |
| H04N 5/235 | (2006.01) | |
| G06K 9/20 | (2006.01) | |
| H04N 5/353 | (2011.01) | |
| H04N 5/225 | (2006.01) | |
| H04N 5/376 | (2011.01) | |
| H04N 5/232 | (2006.01) | |
| H04N 5/369 | (2011.01) | |
| H04N 5/351 | (2011.01) | |

(52) U.S. Cl.
CPC ....... *G06K 9/00604* (2013.01); *G06K 9/2027* (2013.01); *H04N 5/2256* (2013.01); *H04N 5/2354* (2013.01); *H04N 5/3532* (2013.01); *H04N 5/3765* (2013.01); *H04N 5/23219* (2013.01)

(58) Field of Classification Search
CPC ............ H04N 5/23219; H04N 5/2256; H04N 5/2354; H04N 5/3532; H04N 5/2329; H04N 5/3765; H04N 5/369; H04N 5/351; G06K 9/00604; G06K 9/2027
USPC .......................................... 348/78, 370, 371
See application file for complete search history.

(56) References Cited

U.S. PATENT DOCUMENTS

| | | | |
|---|---|---|---|
| 7,234,641 B2 | 6/2007 | Olmstead | |
| 7,430,365 B2 | 9/2008 | Ng et al. | |
| 8,953,849 B2 | 2/2015 | Hanna | |
| 10,009,554 B1 * | 6/2018 | Miao | H04N 5/33 |
| 2003/0007088 A1 * | 1/2003 | Rantanen | H04N 5/2354 348/371 |
| 2006/0113386 A1 | 6/2006 | Olmstead | |
| 2006/0238643 A1 * | 10/2006 | Liao | H04N 5/3532 348/371 |
| 2008/0199165 A1 | 8/2008 | Ng et al. | |

(Continued)

FOREIGN PATENT DOCUMENTS

| | | |
|---|---|---|
| KR | 10-0342159 B1 | 6/2002 |
| KR | 10-1323483 B1 | 10/2013 |

(Continued)

*Primary Examiner* — Albert H Cutler
(74) *Attorney, Agent, or Firm* — Sughrue Mion, PLLC

(57) ABSTRACT

An image sensor includes a pixel array including a plurality of pixel units, and a controller configured to generate a light control signal for controlling light reflected from an object to expose the plurality of pixel units to the light at least twice during generation of an image frame.

5 Claims, 9 Drawing Sheets

(56) References Cited

U.S. PATENT DOCUMENTS

| | | | |
|---|---|---|---|
| 2012/0314124 A1* | 12/2012 | Kaizu | .................. H04N 5/2353 |
| | | | 348/362 |
| 2014/0112550 A1 | 4/2014 | Hanna | |
| 2014/0225998 A1* | 8/2014 | Dai | ................... H01L 27/14601 |
| | | | 348/65 |
| 2015/0098629 A1 | 4/2015 | Perna et al. | |
| 2015/0186722 A1* | 7/2015 | Cho | ................... G06K 9/00604 |
| | | | 348/78 |
| 2015/0245767 A1 | 9/2015 | Northcott et al. | |
| 2016/0248971 A1 | 8/2016 | Tall et al. | |
| 2017/0277950 A1* | 9/2017 | Sung | ........................ G06K 9/00 |

FOREIGN PATENT DOCUMENTS

| | | | |
|---|---|---|---|
| KR | 10-1674099 B1 | | 11/2016 |
| WO | WO 2016/035901 | * | 3/2016 |

* cited by examiner

IMAGE SENSOR AND ELECTRONIC APPARATUS INCLUDING THE SAME

CROSS-REFERENCE TO THE RELATED APPLICATION

This application claims priority from Korean Patent Application No. 10-2017-0069566, filed on Jun. 5, 2017, in the Korean Intellectual Property Office, the disclosure of which is incorporated herein by reference in its entirety.

BACKGROUND

1. Field

Apparatuses and methods consistent with the exemplary embodiments of the inventive concept relate to an image sensor and an electronic apparatus including the same.

2. Description of the Related Art

An image sensor is a semiconductor device which senses light reflected from an object and converts the light into an electrical signal, and has been used in various fields, including electronic apparatuses such as digital cameras, cellular phones, etc. and vehicles, drones, and security and authentication devices.

Recently, image sensors have been extensively applied to bio-information authentication sensors. Thus, research has been actively conducted on security technology for obtaining bio-information using an image sensor and authenticating a user on the basis of the obtained bio-information.

Much attention has been paid to security technology based on iris information which is bio-information, since every person has a different iris shape and his or her own iris information is difficult to imitate and hardly changes during his or her lifetime.

SUMMARY

The present inventive concept is directed to providing an image sensor capable of obtaining a clearer image and an electronic apparatus including the same.

An image sensor according to an exemplary embodiment includes a pixel array including a plurality of pixel units, and a controller configured to generate a light control signal for controlling light reflected from an object to expose the plurality of pixel units to the light at least twice during generation of an image frame.

An electronic apparatus according to an exemplary embodiment includes a processor configured to execute an application program and generate a control signal, a camera including an image sensor configured to generate a light control signal for controlling light reflected from an object to expose a plurality of pixel units to the light at least twice during generation of an image frame, in response to the control signal, and a light-emitting module configured to generate the light in connection with the light control signal.

An electronic apparatus according to an exemplary embodiment includes a camera including an image sensor configured to generate an image frame by exposing a plurality of pixel units to light reflected from an object, a processor configured to perform an application program and generate a light control signal for controlling the light to expose the plurality of pixel units to the light at least twice while the image sensor generates the image frame, and a light-emitting module configured to generate the light in connection with the light control signal.

BRIEF DESCRIPTION OF THE DRAWINGS

The above and other objects, features and advantages of the inventive concept will become more apparent to those of ordinary skill in the art by describing exemplary embodiments thereof in detail with reference to the accompanying drawings, in which.

DETAILED DESCRIPTION OF THE EXEMPLARY EMBODIMENTS

Hereinafter, an image sensor according to exemplary embodiments will be described in detail with reference to FIGS. 1 to 8 attached herein.

Figure 1:
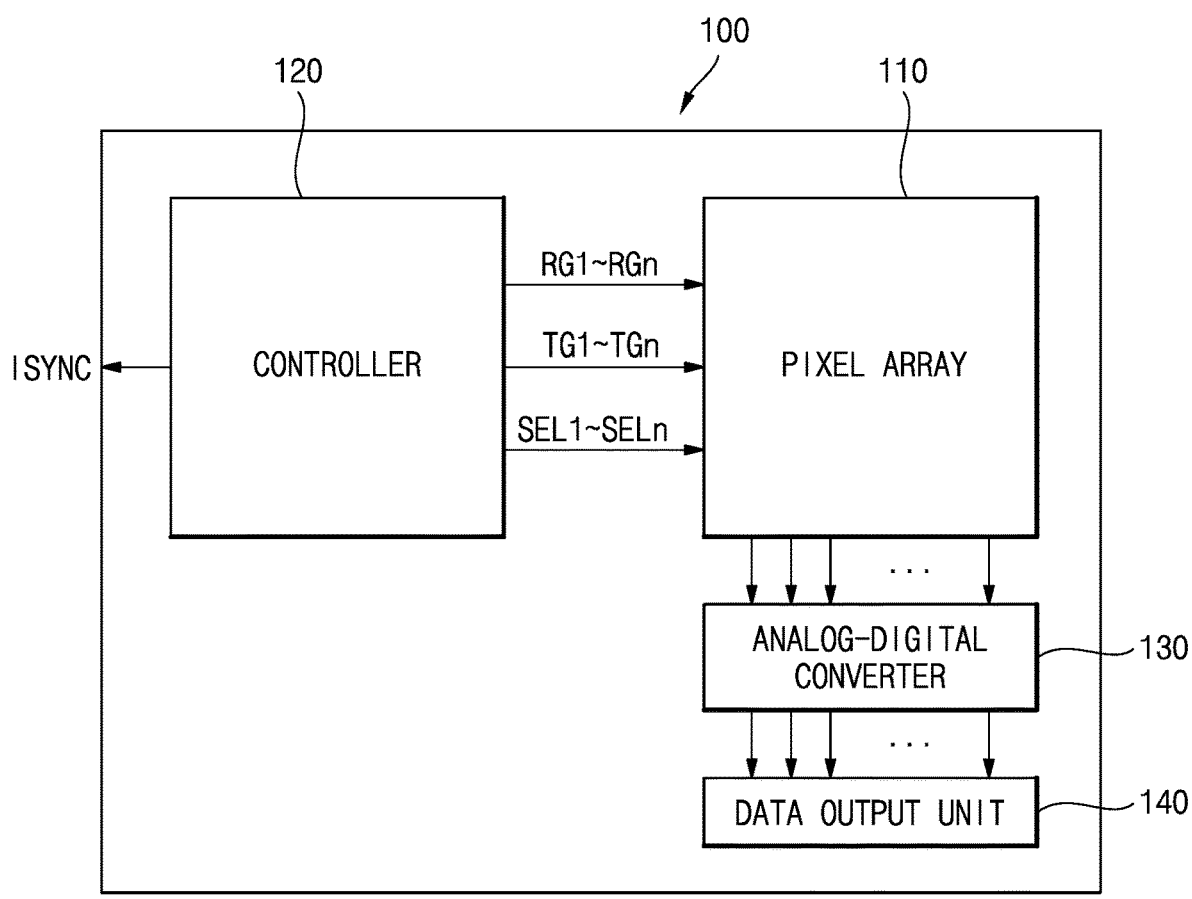
FIG. 1 is a block diagram of an image sensor according to an exemplary embodiment.

FIG. 1 is a block diagram of an image sensor 100 according to an exemplary embodiment. The image sensor 100 includes a pixel array 110, a controller 120, an analog-digital converter (ADC) 130, and a data output interface 140.

The image sensor 100 is an electronic device which generates an image of an object by sensing light which is reflected from the object and is then incident on the image sensor 100. The light differs from natural light which is normally incident on the image sensor 100. For example, the light may be incident via a filter which allows light of a specific band to pass the filter (e.g., an infrared filter) to be then sensed by the image sensor 100. For example, the image sensor 100 may be a complementary metal oxide semiconductor (CMOS) image sensor 100.

The pixel array 110 generates a pixel signal in response to the light reflected from the object. The pixel array 110 accumulates charges in response to the light according to reset signals RG1 to RGn, transmission signals TG1 to TGn, and selection signals SEL1 to SELn, and generates the pixel signal by sensing a potential change in the accumulated charges. The pixel array 110 transmits the pixel signal to the ADC 130.

The controller 120 generates a light control signal ISYNC, and transmits the reset signals RG1 to RGn, the transmission signals TG1 to TGn, and the selection signals SEL1 to SELn to the pixel array 110.

The light control signal ISYNC is a signal for controlling light incident on the image sensor 100 during generation of one image frame. The controller 120 may transmit the light control signal ISYNC to a device which generates light (e.g., a light-emitting diode (LED), a flash lamp, or the like). For example, the light control signal ISYNC may control only generation of light, and a period during which the light is continuously generated may be preset or determined according to a combination of other signals.

The ADC 130 receives a plurality of pixel signals from the pixel array 110. The ADC 130 converts a pixel signal in an analog form into a digital signal, and transmits the digital signal to the data output interface 140. For example, the ADC 130 compares intensity of a signal on which correlated double sampling is performed based on the pixel signal in the analog form with that of a ramp signal. The ADC 130 may generate a comparison signal corresponding to the difference between the intensities of the correlated double sampled signal and the ramp signal, and convert the pixel signal into the digital signal by counting the comparison signal.

The data output interface 140 temporarily stores, senses, and amplifies a plurality of digital signals output from the ADC 130, and then, output the amplified digital signals to the outside. For example, the data output interface 140 may be a buffer which includes a memory (not shown) for storing a digital signal, and an amplifier (not shown) for sensing and amplifying the digital signal.

Figure 2:
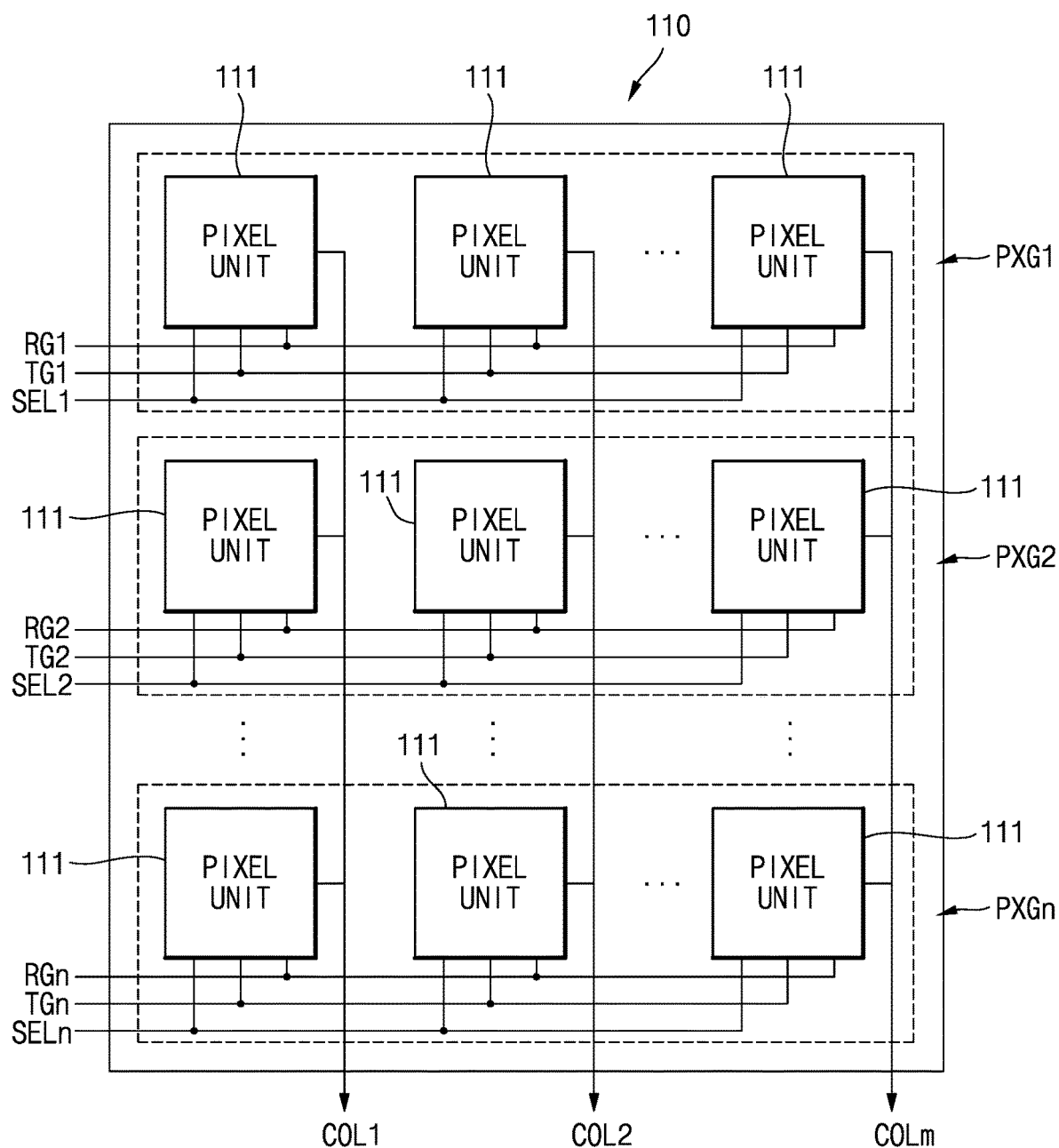
FIG. 2 is a block diagram of a pixel array according to an exemplary embodiment.

FIG. 2 is a block diagram of the pixel array 110 according to an exemplary embodiment. The pixel array 110 includes n pixel groups PXG1 to PXGn. The pixel groups PXG1 to PXGn include a plurality of pixel units 111.

For example, the plurality of pixel units 111 are arranged in an NxM matrix, and a group including pixel units 111 arranged in each row may be set to be one of the pixel groups PXG1 to PXGn. However, each of the pixel groups PXG1 to PXGn need not be set to include pixel units 111 arranged in the same row. For example, each of the pixel groups PXG1 to PXGn may be set to include pixel units 111 which simultaneously perform an accumulation operation although the pixel units 111 are not arranged in the same row.

The plurality of pixel units 111 included in the pixel groups PXG1 to PXGn receive reset signals RG1 to RGn, transmission signals TG1 to TGn, and selection signals SEL1 to SELn.

For example, the pixel units 111 included in the first pixel group PXG1 receives the first reset signal RG1, the first transmission signal TG1, and the first selection signal SEL1. The pixel units 111 included in the last pixel group PXGn receives the $N^{th}$ reset signal RGn, the $N^{th}$ transmission signal TGn, and the $N^{th}$ selection signal SELn.

In the pixel array 110, an operation thereof need not be performed in a unit of a pixel group, and instead, may be performed in a unit of two or more pixel groups.

The exemplary embodiments described herein may also be applicable when the pixel groups PXG1 to PXGn are operated by being divided into two groups having different accumulation time periods EIT1 to EITn.

For example, the pixel array 110 may perform the operation thereof on the basis of a rolling shutter method. Alternatively, the pixel array 110 may perform the operation thereof on the basis of a tetra cell or a wide dynamic range (WDR) method.

The pixel array 110 performs an accumulation operation of accumulating charges corresponding to light reflected from an object in the accumulation time periods EIT1 to EITn. The accumulation operation is sequentially performed with respect to the pixel groups PXG1 to PXGn.

The pixel array 110 performs a transmission operation of transmitting the accumulated charges to a pixel node FD in transmission time periods TP1 to TPn. The transmission operation is sequentially performed with respect to the pixel groups PXG1 to PXGn.

The pixel array 110 performs a readout operation of generating a signal corresponding to a potential of the pixel node FD in readout time periods ROP1 to ROPn. The readout operation is also sequentially performed with respect to the pixel groups PXG1 to PXGn.

Since the pixel groups PXG1 to PXGn sequentially perform the accumulation operation, starting points and ending points of the accumulation time periods EIT1 to EITn thereof are different. The controller 120 generates the light control signal ISYNC to equalize exposure time periods ET1 to ETn in the respective accumulation time periods EIT1 to EITn having different starting and ending points of the pixel groups PXG1 to PXGn.

To equalize the exposure time periods ET1 to ETn of the pixel groups PXG1 to PXGn, the light control signal ISYNC may be generated at least once in the accumulation time period EIT1 of the first pixel group PXG1 and generated at least once in the accumulation time period EITn of the last pixel group PXGn.

The first pixel group PXG1 may be one of pixel groups which first perform the accumulation operation, and the last pixel group PXGn may be one of pixel groups which lastly perform the accumulation operation among the pixel groups PXG1 to PXGn.

The image sensor 100 according to an exemplary embodiment generates an image on the basis of the equal exposure time periods ET1 to ETn. Accordingly, image distortion caused when the exposure time periods ET1 to ETn of the pixel groups PXG1 to PXGn are different may be minimized to generate a clear image.

Figure 3:
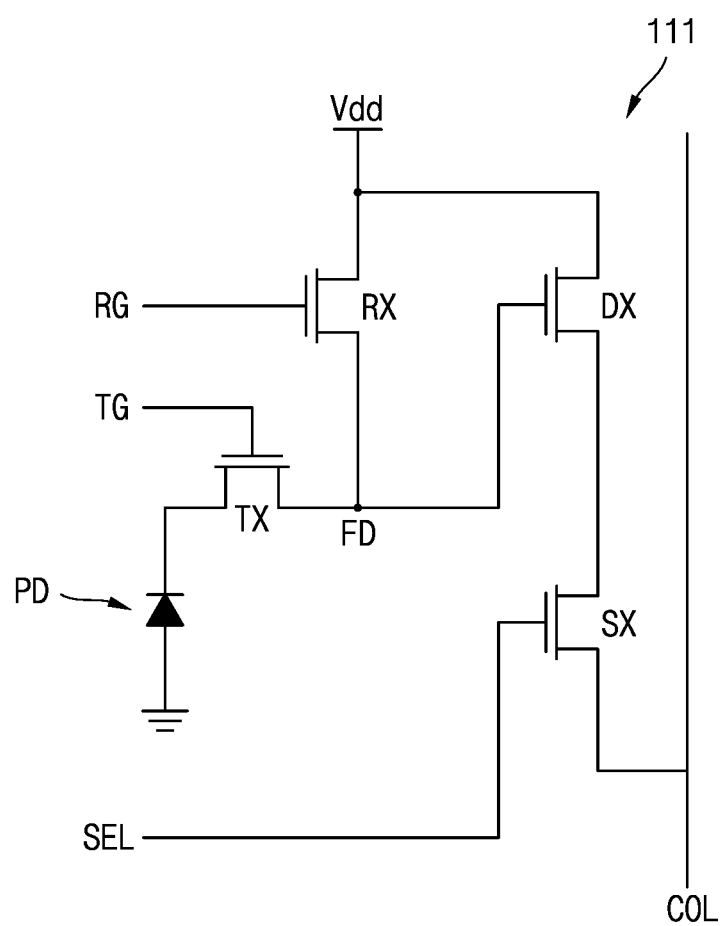
FIG. 3 is a circuit diagram of a pixel unit according to an exemplary embodiment.

FIG. 3 is a circuit diagram of the pixel unit 111 according to an exemplary embodiment. The pixel unit 111 includes a reset transistor RX, a photodiode PD, a transmission transistor TX, a drive transistor DX, and an output transistor SX. For more details, see Korean Laid-open Patent Publication No. 2012-0031403 disclosing the pixel unit 111.

Figure 4:
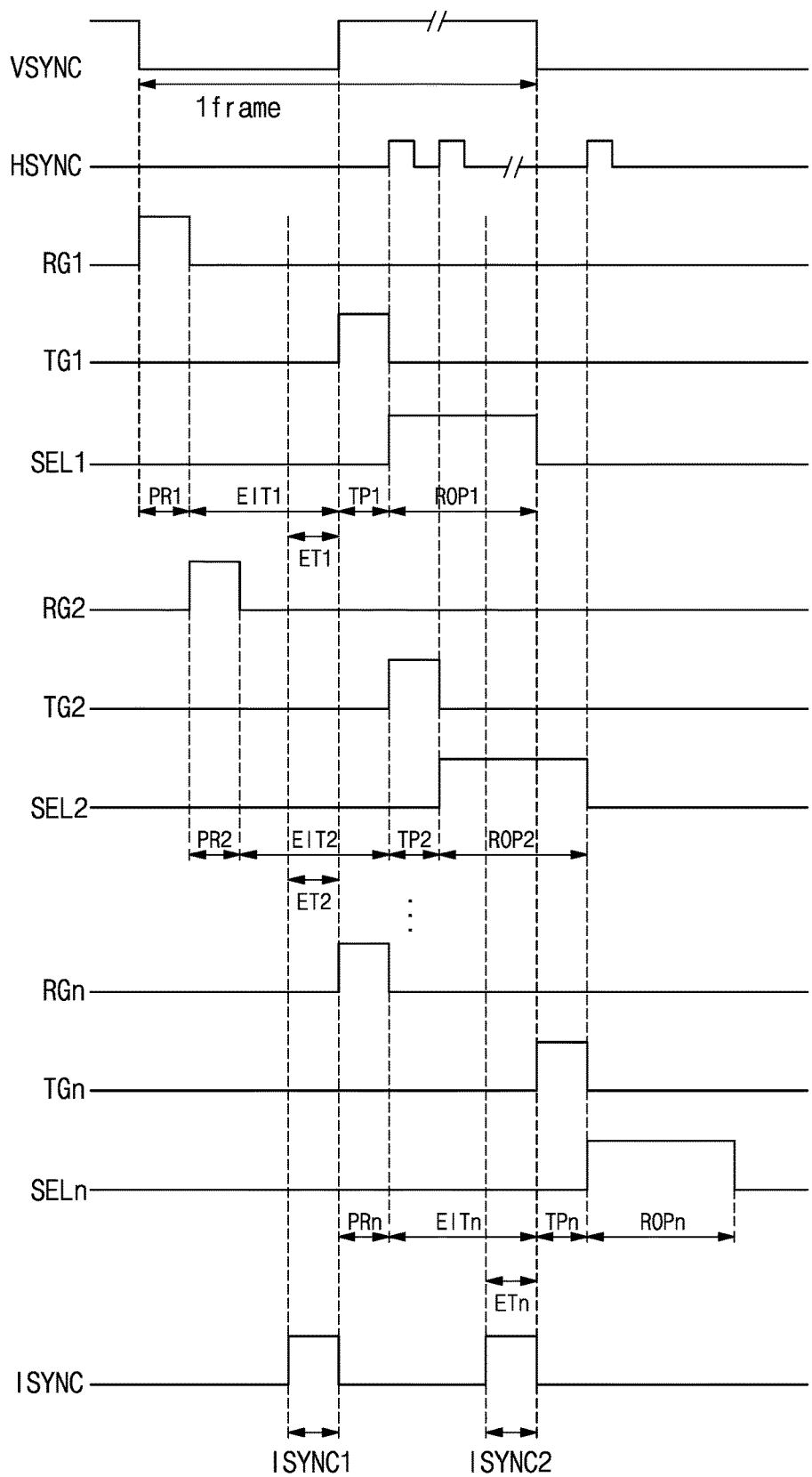
FIGS. 4 to 6 are diagrams illustrating timings of a vertical synchronization signal, accumulation time periods of pixel groups, and a light control signal according to an exemplary embodiment.
Figure 5:
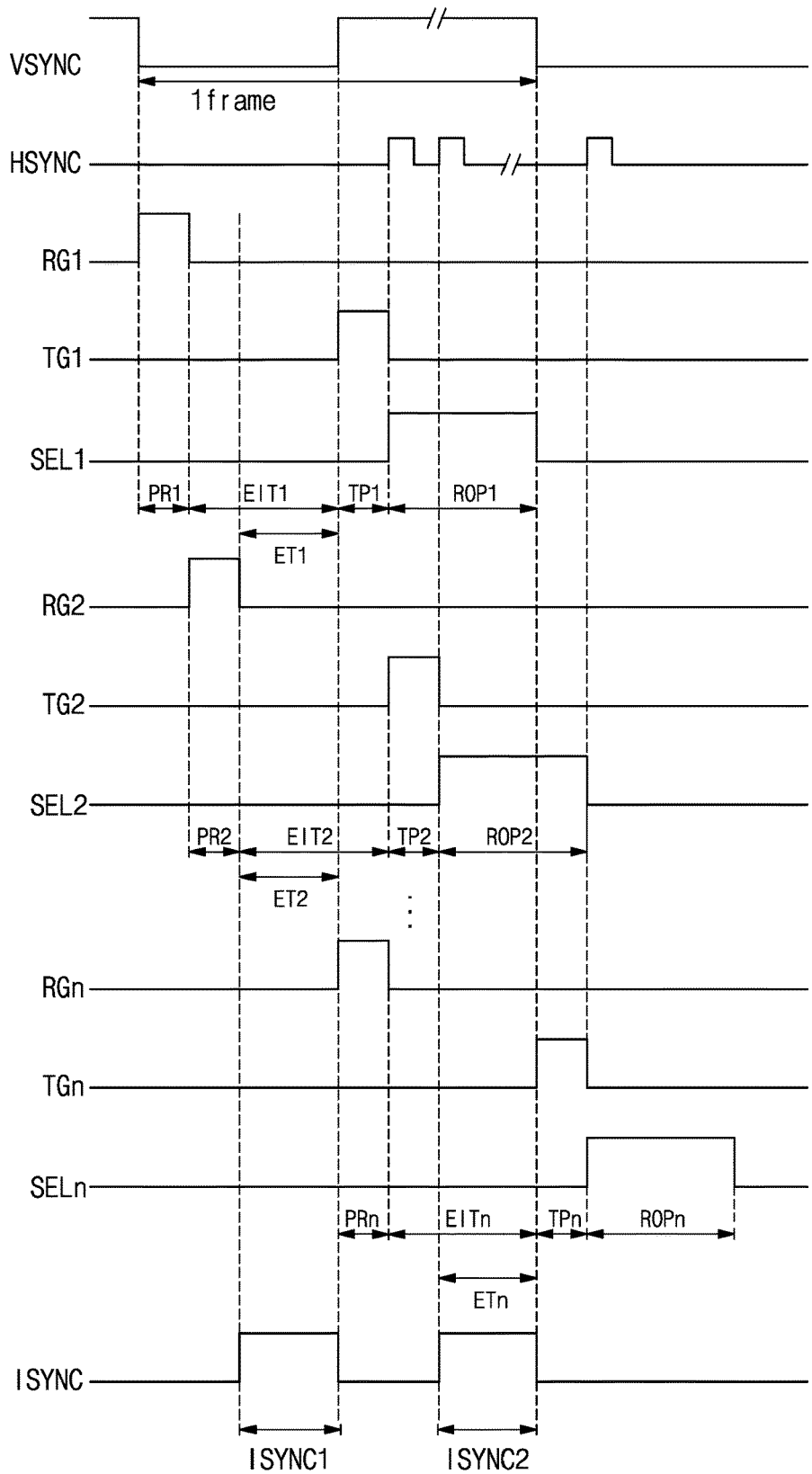

FIGS. 4 and 5 are diagrams illustrating timings of the accumulation time periods EIT1 to EITn of the pixel groups PXG1 to PXGn and a light control signal ISYNC when the accumulation time periods EIT1 to EITn are greater than or equal to the readout time periods ROP1 to ROPn.

Although FIG. 4 illustrates a case in which the accumulation time periods EIT1 to EITn are equal to the readout time periods ROP1 to ROPn, the inventive concept is also applicable to a case in which the accumulation time periods EIT1 to EITn are greater than the readout time periods ROP1 to ROPn.

As illustrated in FIG. 4, the controller 120 may generate the light control signal ISYNC including a first pulse ISYNC1 generated in connection with the reset signal RGn for the last pixel group PXGn and a second pulse ISYNC2 generated in connection with the transmission signal TGn for the last pixel group PXGn.

An activation time of the light control signal ISYNC illustrated in FIG. 4, i.e., activation times of the first and second pulses ISYNC1 and ISYNC2, should be understood as a period in which light is generated and maintained.

The first pulse ISYNC1 may be in a deactivated state not to generate light at a point of time when the reset signal RGn for the last pixel group PXGn is generated. The second pulse ISYNC2 may be in a deactivated state not to generate light at a point of time when the transmission signal TGn for the last pixel group PXGn is generated.

In other words, a falling edge of the first pulse ISYNC1 may be aligned with the point of time when the reset signal RGn for the last pixel group PXGn is generated. A falling edge of the second pulse ISYNC2 may be aligned with the point of time when the transmission signal TGn for the last pixel group PXGn is generated.

When the accumulation time periods EIT1 to EITn are equal to the readout time periods ROP1 to ROPn, the accumulation time period EITn of the last pixel group PXGn starts after the accumulation time period EIT1 of the first pixel group PXG1. When the first pulse ISYNC1 is activated, and then, deactivated before the accumulation time period EITn of the last pixel group PXGn begins, the pixel units 111 of the last pixel group PXGn are not exposed to light generated from the first pulse ISYNC1. To equalize the exposure time periods ET1 to ETn of the pixel groups PXG1 to PXGn, the controller 120 activates the second pulse ISYNC2 according to the accumulation time period EITn of the last pixel group PXGn.

As illustrated in FIG. 4, the exposure time period ET1 of the first pixel group PXG1, the exposure time period ET2 of the second pixel group PXG2, and the exposure time period ETn of the last pixel group PXGn are the same.

As illustrated in FIG. 4, the controller 120 may generate the light control signal ISYNC in connection with a vertical synchronization signal VSYNC.

The vertical synchronization signal VSYNC is a signal identifying one image frame. For example, when the vertical synchronization signal VSYNC is activated once, it means that one image frame is generated.

In this case, the light control signal ISYNC may include the first pulse ISYNC1 and the second pulse ISYNC2. The first pulse ISYNC1 is deactivated not to generate light when the vertical synchronization signal VSYNC is activated. The second pulse ISYNC2 is deactivated not to generate light when the vertical synchronization signal VSYNC is deactivated.

The controller 120 may generate the light control signal ISYNC in connection with a horizontal synchronization signal HSYNC. The horizontal synchronization signal HSYNC is a signal which synchronizes transmission of pixel signals generated by the pixel groups PXG1 to PXGn.

According to an exemplary embodiment, the first pulse ISYNC1 may be connected with the transmission signal TG1 for the first pixel group PXG1, and the second pulse ISYNC2 may be connected with the selection signal SEL1 of the first pixel group PXG1.

Alternatively, the controller 120 may generate the light control signal ISYNC in connection with a shutter signal for starting generation of an image frame, the reset signals RG1 to RGn, the transmission signals TG1 to TGn, the selection signals SEL1 to SELn, or other signals. Otherwise, the controller 120 may generate the light control signal ISYNC according to a program which is preset by a user.

When the exposure time periods ET1 to ETn of the pixel groups PXG1 to PXGn are the same, the light control signal ISYNC may be activated according to a combination of various signals.

According to an exemplary embodiment, a light generation period may be adjusted. For example, the controller 120 may adjust the light generation period by adjusting widths of the first and second pulses ISYNC1 and ISYNC2. The controller 120 may increase the widths of the first and second pulses ISYNC1 and ISYNC2 illustrated in FIG. 4 to be substantially the same as those of the first and second pulses ISYNC1 and ISYNC2 illustrated in FIG. 5.

The controller 120 may adjust the activation time of the light control signal ISYNC to increase a rate of recognition of an object in various environments. In order to prevent light from being generated in all the accumulation time periods EIT1 to EITn, the controller 120 may discontinuously activate the first pulse ISYNC1 and the second pulse ISYNC2.

Thus, according to an exemplary embodiment, a signal-to-noise ratio (SNR) may be improved or power consumption caused by light generation may be controlled in various environments by adjusting the light generation period.

Figure 6:
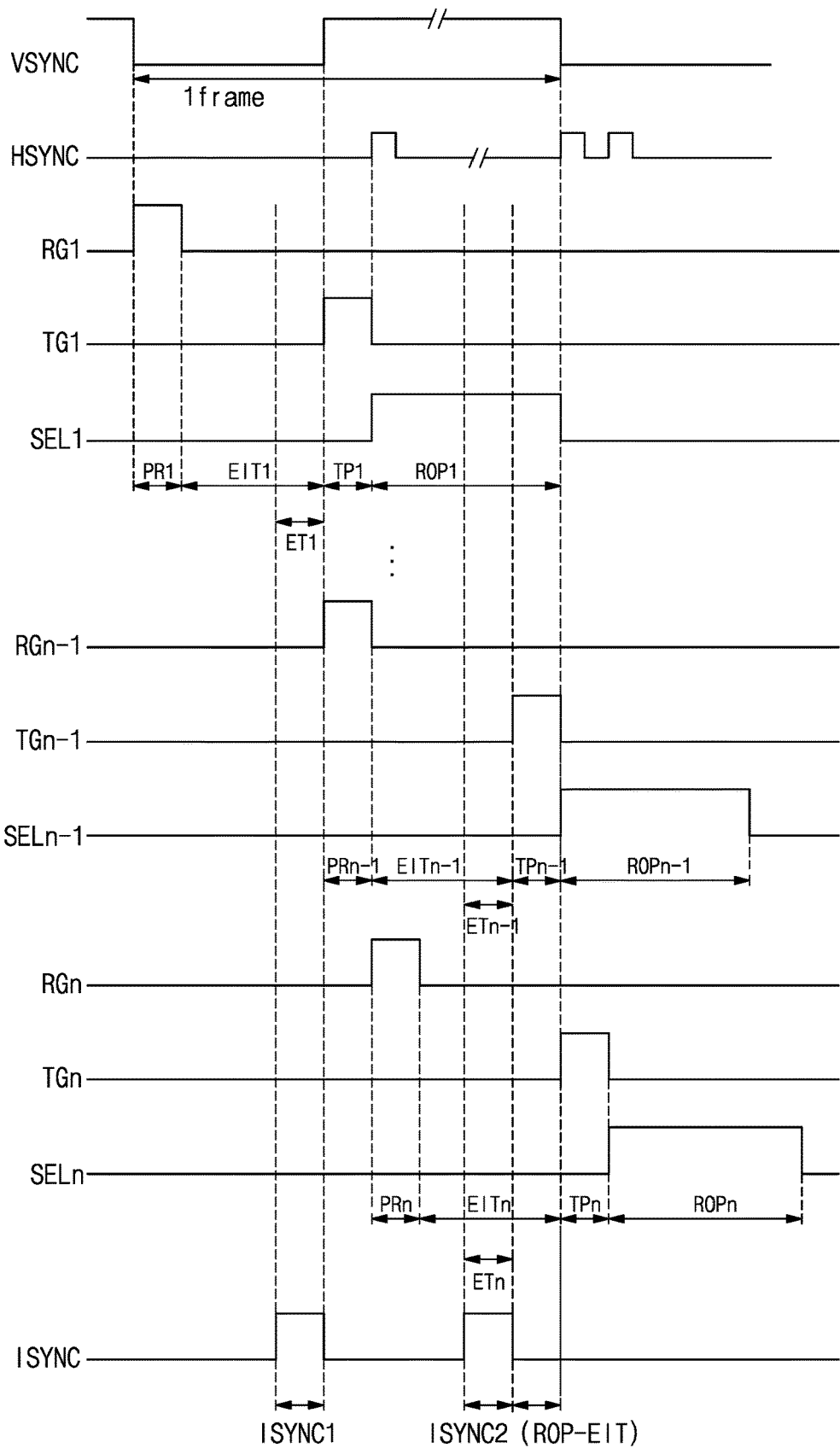

FIG. 6 is a diagram illustrating timings of the accumulation time periods EIT1 to EITn of the pixel groups PXG1 to PXGn and the light control signal ISYNC when the accumulation time periods EIT1 to EITn are shorter than the readout time periods ROP1 to ROPn and is greater than or equal to half the sum of the readout time periods ROP1 to ROPn and the light control signal ISYNC. Here, the activation time of the light control signal ISYNC should be understood as the widths of the first and second pulses ISYNC1 and ISYNC2.

In other words, when the accumulation time periods EIT1 to EITn satisfy Formula 1 below, the controller 120 may generate the light control signal ISYNC including the first pulse ISYNC1 generated in connection with the transmission signal TG1 for the first pixel group PXG1 and the second pulse ISYNC2 generated in connection with the transmission signal TGn for the last pixel group PXGn.

$$ROP > EIT \geq (ROP + PULSE\_WIDTH)/2 \qquad \text{[Formula 1]}$$

(ROP=readout time periods ROP1 to ROPn, EIT=accumulation time periods EIT1 to EITn, PULSE_WIDTH=activation time of light control signal ISYNC activated once)

In this case, the first pulse ISYNC1 may be in a deactivated state not to generate light at a point of time when the transmission signal TG1 for the first pixel group PXG1 is generated. The second pulse ISYNC2 may be in a deactivated state not to generate light from a point of time ahead, by a time period (ROP-EIT) which is a result of subtracting the accumulation time periods EIT1 to EITn from the readout time periods ROP1 to ROPn, of a point of time when the transmission signal TGn for the last pixel group PXGn is generated.

In other words, a falling edge of the first pulse ISYNC1 may be aligned with the point of time when the transmission signal TG1 for the first pixel group PXG1 is generated. A falling edge of the second pulse ISYNC2 may be aligned with a point of time ahead by the time period (ROP-EIT) from the point of time when the transmission signal TGn for the last pixel group PXGn is generated.

As illustrated in FIG. 6, the exposure time period ET1 of the first pixel group PXG1, the exposure time period ETn-1 of the $(N-1)^{th}$ pixel group PXGn-1, and the exposure time period ETn of the last pixel group PXGn are the same.

When the readout time periods ROP1 to ROPn are greater than or equal to the accumulation time periods EIT1 to EITn as illustrated in FIG. 6, the design complexity and area of a signal processing circuit may be prevented from being increased and power consumption for signal processing may be also prevented from being increased, since signal processing need not be performed at high speeds in the image sensor 100.

Figure 7:
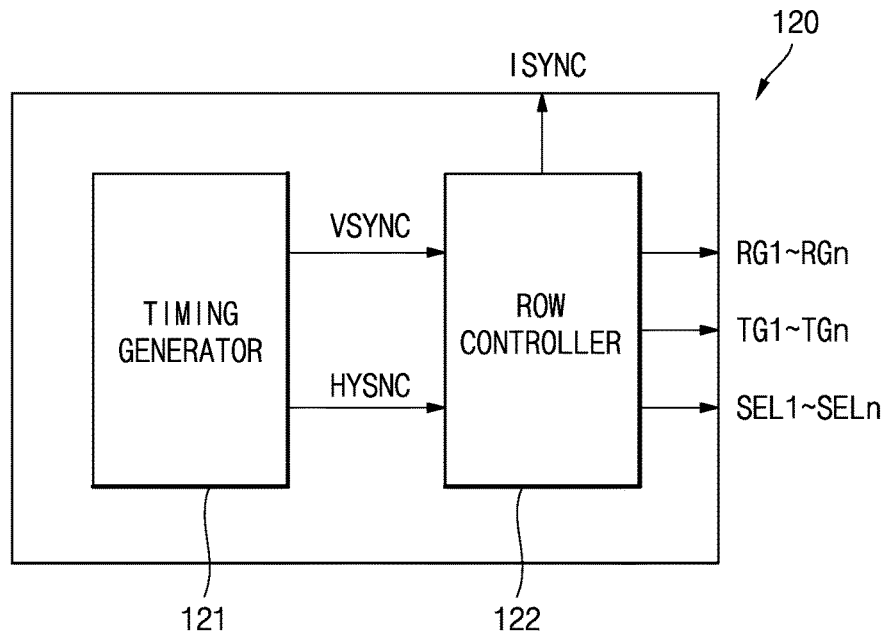
FIGS. 7 and 8 are block diagrams of controllers according to embodiments.
Figure 8:
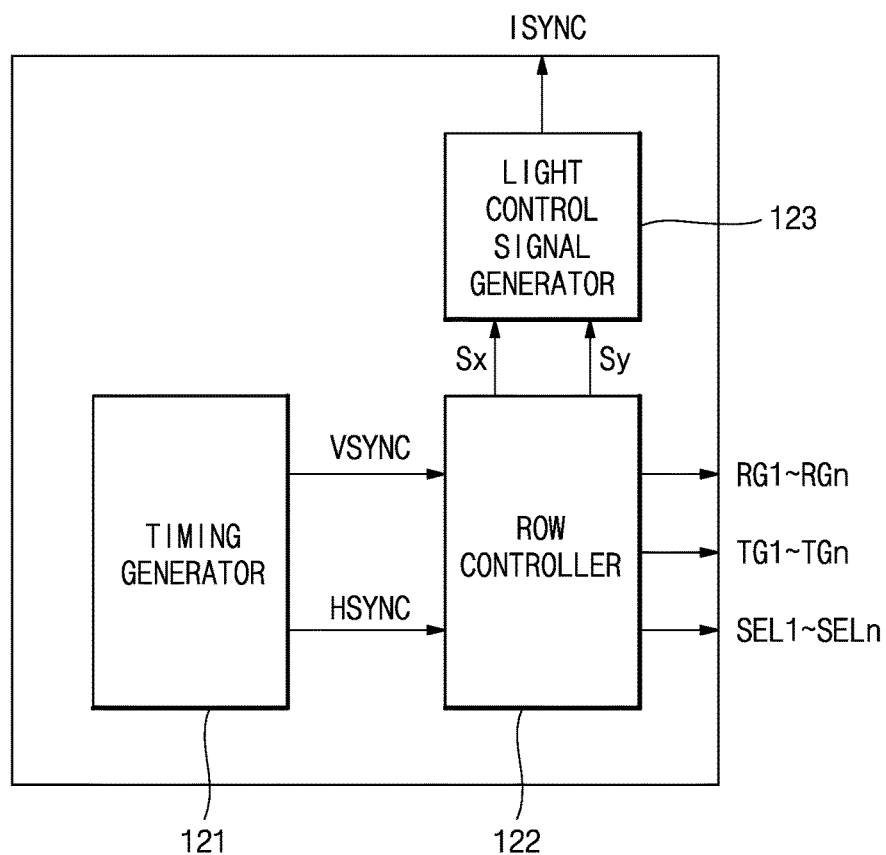

FIGS. 7 and 8 are block diagrams of controllers 120 according to exemplary embodiments.

As illustrated in FIG. 7, the controller 120 may include a timing generator 121 and a row controller 122.

The timing generator 121 may generate a vertical synchronization signal VSYNC and a horizontal synchronization signal HSYNC and transmit them to the row controller 122 or the outside. A clock pulse for a signal to be processed in the timing generator 121 by the image sensor 100 may be generated. Alternatively, an additional clock generator (not shown) may generate a clock pulse and the timing generator 121 may receive the clock pulse. The timing generator 121 controls timing of signals to be processed by the image sensor 100, as well as the vertical synchronization signal VSYNC and the horizontal synchronization signal HSYNC, on the basis of the clock pulse.

The row controller 122 sequentially generate the reset signals RG1 to RGn, the transmission signals TG1 to TGn, and the selection signals SEL1 to SELn corresponding to the pixel groups PXG1 to PXGn on the basis of the vertical synchronization signal VSYNC and the horizontal synchronization signal HSYNC.

The row controller 122 may generate a light control signal ISYNC such that the exposure time periods ET1 to ETn of the pixel groups PXG1 to PXGn are the same in the respective accumulation time periods EIT1 to EITn of the pixel groups PXG1 to PXGn.

As illustrated in FIG. 8, the controller 120 may include a timing generator 121, a row controller 122, and a light control signal generator 123.

The timing generator 121 generates a vertical synchronization signal VSYNC, a horizontal synchronization signal HSYNC, etc. The row controller 122 sequentially generates the reset signals RG1 to RGn, the transmission signals TG1 to TGn, and the selection signals SEL1 to SELn for the pixel groups PXG1 to PXGn.

The light control signal generator 123 may generate a light control signal ISYNC such that the exposure time periods ET1 to ETn of the pixel groups PXG1 to PXGn are the same in the respective accumulation time periods EIT1 to EITn of the pixel groups PXG1 to PXGn. For example, the light control signal generator 123 may be a pulse generator.

The light control signal generator 123 generates the light control signal ISYNC on the basis of signals Sx and Sy received from the row controller 122. The signals Sx and Sy may be various combinations of signals for equalizing the exposure time periods ET1 to ETn in the respective accumulation time periods EIT1 to EITn of the pixel groups PXG1 to PXGn.

The light control signal ISYNC is generated by the controller 120 controlling an accumulation operation and a readout operation. Thus, according to an exemplary embodiment, the light control signal ISYNC may be activated exactly according to timing of accumulation operations of the pixel groups PXG1 to PXGn.

An electronic apparatus according to an exemplary embodiment will be described with reference to FIGS. 9 and 10 below. A part of the electronic apparatus which is the same as the structure described above in relation thereto will not be redundantly described or will be briefly described below.

Figure 9:
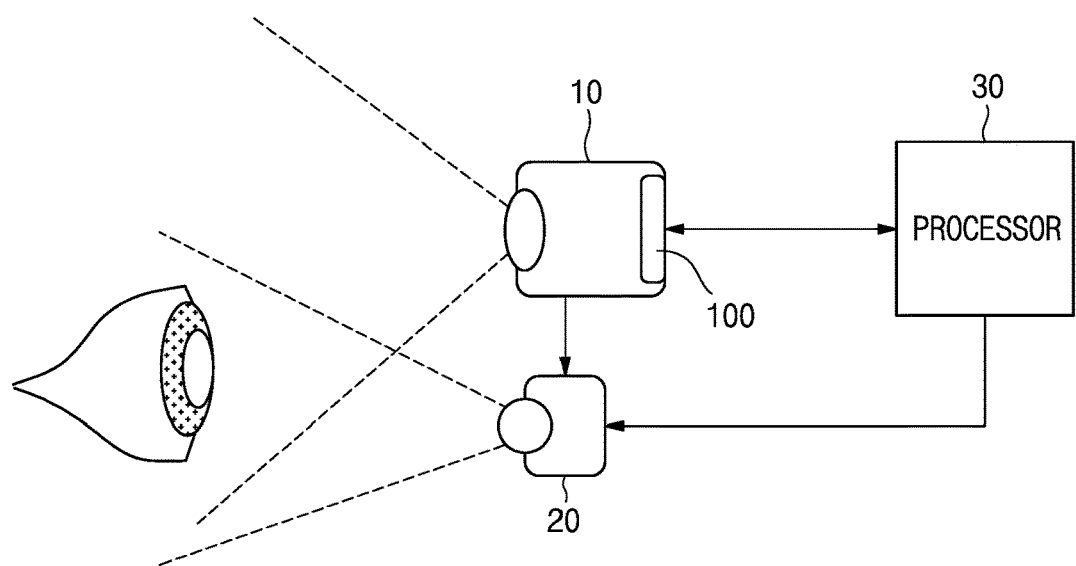
FIG. 9 is a block diagram of an electronic apparatus including an image sensor according to an exemplary embodiment.

As illustrated in FIG. 9, the electronic apparatus includes a camera 10 having an image sensor as described above, a light-emitting module 20, and a processor 30.

The light-emitting module 20 emits light to an object according to a light control signal ISYNC generated by either an image sensor 100 or the processor 30. For example, the object may be an iris of a human eye. The light-emitting module 20 may include an infrared LED which generates infrared light.

The light-emitting module 20 may determine a period during which light is generated and maintained. For example, light may be generated when the light control signal ISYNC is activated and the generation of the light may be continued for a predetermined time under control of the light-emitting module 20. A light generation period may be determined under control of the processor 30.

The processor 30 may control driving of the camera 10 using a control signal generated by running a predetermined application program. The processor 30 may control the image sensor 100 of the camera 10 to generate the light control signal ISYNC according to the application program. For example, when the application program is driven and a shooting command is input by a user, the processor 30 may transmit a control signal instructing the image sensor 100 to generate the light control signal ISYNC to the image sensor 100.

According to an exemplary embodiment, the processor 30 may directly generate the light control signal ISYNC such that light is generated at least twice during generation of an image frame.

The processor 30 analyzes an image frame of a user's iris according to the application program. For example, the processor 30 may authenticate the user by analyzing the image frame of the user's iris according to an authentication application program. The processor 30 may compare an image of the user's iris with iris characteristic patterns registered beforehand, and determine that the authentication of the user succeeds when the number of iris characteristic patterns matching the image of the user's iris is greater than or equal to a predetermined number. However, this method is merely an example and various other methods are applicable to the technical idea of the present inventive concept, provided that a user may be authenticated using an image of the user's iris.

The processor 30 may be, for example, a central processing unit (CPU), an application processor (AP), or a communication processor (CP).

The camera 10 may obtain an image using light generated by the light-emitting module 20, and transmit the image to the processor 30. The camera 10 includes a lens and the image sensor 100. The lens receives light reflected from an object.

Figure 10:
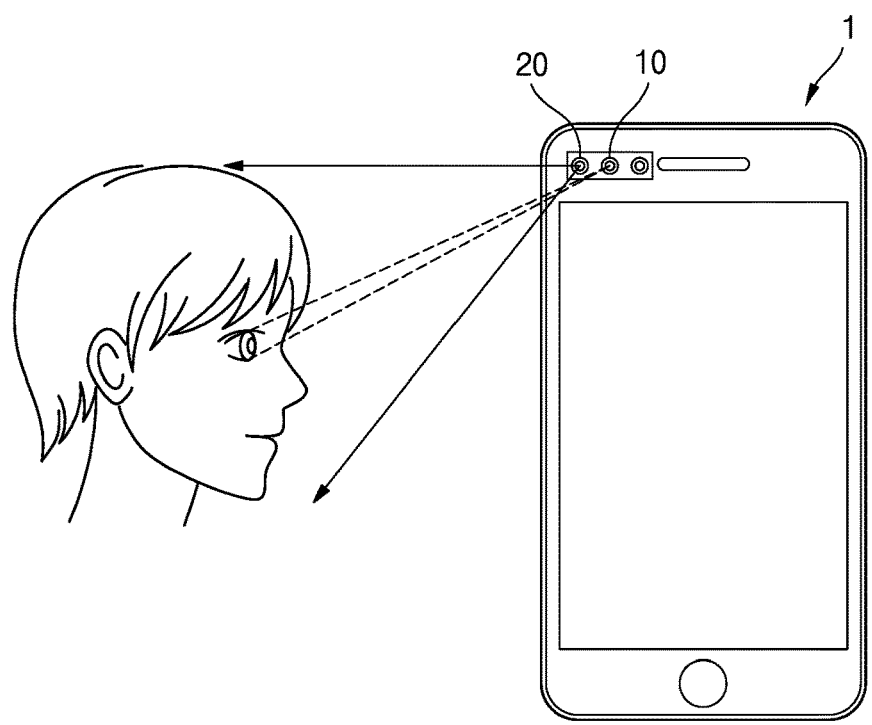
FIG. 10 is a diagram illustrating a smart phone including an electronic apparatus according to an exemplary embodiment.

FIG. 10 is a diagram illustrating a smart phone 1 to which an electronic apparatus according to an exemplary embodiment is applied. A light-emitting module 20 may include an infrared LED and emit infrared light to a region around a user's eye. Infrared light reflected from the user is incident via a lens of a camera module 10, and an image of the iris of the user's eye is obtained from the infrared image.

However, the smart phone 1 is merely an example, and the electronic apparatus is applicable to at least one among a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, and a wearable device (e.g., a head-mounted-device (HMD) such as electronic glasses, electronic clothing, an electronic bracelet, an electronic necklace, electronic appcessory, or a smartwatch).

Figure 11:
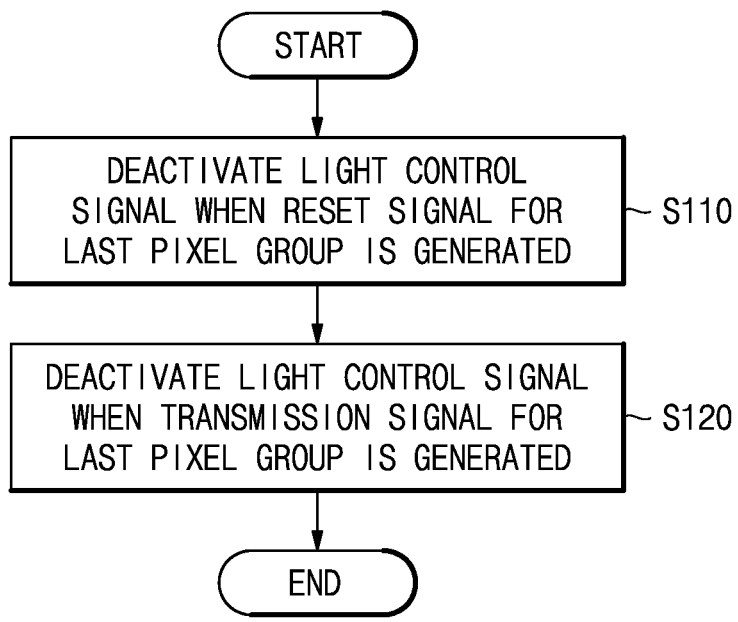
FIGS. 11 and 12 are flowcharts of methods of generating a light control signal, performed by an image sensor, according to exemplary embodiments.
Figure 12:
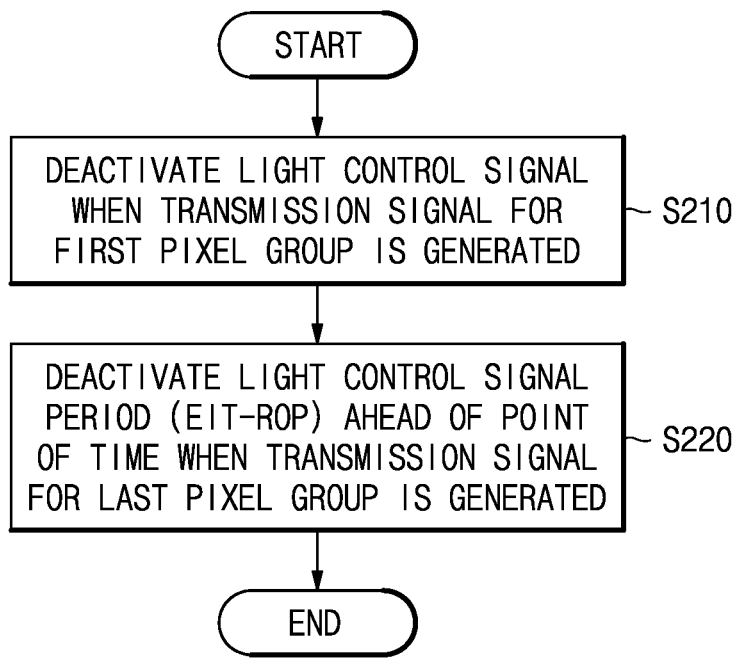

Methods of generating a light control signal, performed by an image sensor, according to exemplary embodiments will be described with reference to FIGS. 11 and 12 below. Parts of the methods which are the same as the structure described above in relation thereto will not be redundantly described or will be briefly described below.

A light control signal ISYNC for generating light is activated at least once in the accumulation time period EIT1 during which the pixel units 111 of the first pixel group PXG1 accumulate charges corresponding to incident light.

Next, the light control signal ISYNC is activated at least once in the accumulation time period EITn during which the pixel units 111 of the last pixel group PXGn accumulate charges corresponding to the light.

In detail, when the accumulation time periods EIT1 to EITn are greater than or equal to the readout time periods ROP1 to ROPn, the controller 120 deactivates the light control signal ISYNC not to generate light at a point of time when the reset signal RGn for the last pixel group PXGn is generated (operation S110). Then, the light control signal ISYNC is deactivated not to generate light at a point of time when the transmission signal TGn for the last pixel group PXGn is generated (operation S120).

When the accumulation time periods EIT1 to EITn satisfy Formula 1 above, the controller 120 deactivates the light control signal ISYNC not to generate light at the point of time when the transmission signal TG1 for the first pixel group PXG1 is generated (operation S210). Then, the light control signal ISYNC is deactivated not to generate light from a point of time ahead, by a time period (ROP-EIT) which is a result of subtracting the accumulation time periods EIT1 to EITn from the readout time periods ROP1 to ROPn, of a point of time when the transmission signal TGn for the last pixel group PXGn is generated (operation S220).

As in operations S210 and S220, the readout time periods ROP1 to ROPn may be set to be longer than the accumulation time periods EIT1 to EITn. Since signal processing need not be performed at high speeds in the image sensor 100 as the readout time periods ROP1 to ROPn increases, the design complexity and area of a signal processing circuit may be prevented from being increased and power consumption caused by signal processing may be also prevented from being increased.

According to various exemplary embodiments, the image sensor 100 capable of improving image quality and reducing power consumption by equalizing the exposure time periods ET1 to ETn of the pixel groups PXG1 to PXGn and efficiently controlling an activation time of the light control signal ISYNC may be provided.

According to the exemplary embodiments, since pixel units are exposed to light for the same exposure time period in accumulation time periods, an image sensor capable of obtaining a clear image may be provided.

According to the exemplary embodiments, since a light control signal is controlled by an image sensor, an electronic apparatus capable of exactly controlling generation of light according to an accumulation operation of the image sensor may be provided.

According to the exemplary embodiments, an electronic apparatus capable of reliably operating an application on the basis of a clear image generated by an image sensor may be provided.

While the exemplary embodiments have been described with reference to the accompanying drawings, it should be understood by those skilled in the art that various modifications may be made without departing from the scope of the inventive concept and without changing essential features. Therefore, the above-described exemplary embodiments should be considered in a descriptive sense only and not for purposes of limitation.

What is claimed is:

1. An image sensor comprising:
a pixel array comprising a plurality of pixel units; and
a controller configured to generate a light control signal for controlling light reflected from an object to expose the plurality of pixel units to the light at least twice during generation of an image frame,
wherein the controller is configured to generate the light control signal comprising at least one pulse:
generated in connection with a transmission signal, corresponding to a transmission operation of transmitting accumulated charges corresponding to the generated light, and/or
deactivated not to generate the light at a point of time when a vertical synchronization signal is generated,
wherein the pixel array comprises a plurality of pixel units divided into a plurality of pixel groups,
wherein the controller performs or controls the pixel array to perform each of following operations, sequentially in units of pixel groups:
a reset operation of initializing an electric potential of pixel node in connection with a plurality of reset signals;
an accumulation operation of accumulating the charges corresponding to the light in accumulation time periods;
the transmission operation of transmitting the accumulated charges to the pixel node in connection with a plurality of transmission signals;
a readout operation of generating a pixel signal on based on a potential change in the pixel node corresponding to the accumulated charges in readout time periods; and
an output operation of outputting the pixel signal in connection with a plurality of selection signals,
wherein the controller generates the light control signal such that the light is generated at least once in the accumulation time period of a first pixel group, and is generated at least once in the accumulation time period of a last pixel group, and
wherein, when the accumulation time periods are greater than or equal to the readout time periods, the controller generates the light control signal comprising a first pulse generated in connection with a reset signal for a last pixel group and a second pulse generated in connection with a transmission signal for the last pixel group.

2. The image sensor of claim 1, wherein the first pulse is deactivated at a point of time when the reset signal for the last pixel group is generated, and
wherein the second pulse is deactivated at a point of time when the transmission signal for the last pixel group is generated.

3. An image sensor comprising:
a pixel array comprising a plurality of pixel units; and
a controller configured to generate a light control signal for controlling light reflected from an object to expose the plurality of pixel units to the light at least twice during generation of an image frame,
wherein the controller is configured to generate the light control signal comprising at least one pulse:
generated in connection with a transmission signal, corresponding to a transmission operation of transmitting accumulated charges corresponding to the generated light, and/or
deactivated not to generate the light at a point of time when a vertical synchronization signal is generated,
wherein the pixel array comprises a plurality of pixel units divided into a plurality of pixel groups,
wherein the controller performs or controls the pixel array to perform each of following operations, sequentially in units of pixel groups:
a reset operation of initializing an electric potential of a pixel node in connection with a plurality of reset signals;

an accumulation operation of accumulating the charges corresponding to the light in accumulation time periods;

the transmission operation of transmitting the accumulated charges to the pixel node in connection with a plurality of transmission signals;

a readout operation of generating a pixel signal on based on a potential change in the pixel node corresponding to the accumulated charges in readout time periods; and an output operation of outputting the pixel signal in connection with a plurality of selection signals, wherein the controller generates the light control signal such that the light is generated at least once in the accumulation time period of a first pixel group, and is generated at least once in the accumulation time period of a last pixel group, and wherein, when the accumulation time periods are shorter than the readout time periods and are greater than or equal to half a sum of the readout time periods and an activation time of the light control signal, the controller generates the light control signal comprising a first pulse generated in connection with a transmission signal for a first pixel group and a second pulse generated in connection with a transmission signal for a last pixel group.

4. The image sensor of claim 3, wherein the first pulse is deactivated at a point of time when the transmission signal for the first pixel group is generated, and wherein the second pulse is deactivated from a point of time ahead, by a period which is a result of subtracting the accumulation time periods from the readout time periods, of a point of time when the transmission signal for the last pixel group is generated.

5. An image sensor comprising:

a pixel array comprising a plurality of pixel units; and a controller configured to generate a light control signal for controlling light reflected from an object to expose the plurality of pixel units to the light at least twice during generation of an image frame, wherein the controller is configured to generate the light control signal comprising at least one pulse:

generated in connection with a transmission signal, corresponding to a transmission operation of transmitting accumulated charges corresponding to the generated light, and/or deactivated not to generate the light at a point of time when a vertical synchronization signal is generated, wherein the pixel array comprises a plurality of pixel units divided into a plurality of pixel groups, wherein the controller performs or controls the pixel array to perform each of following operations, sequentially in units of pixel groups:

a reset operation of initializing an electric potential of a pixel node in connection with a plurality of reset signals;

an accumulation operation of accumulating the charges corresponding to the light in accumulation time periods;

the transmission operation of transmitting the accumulated charges to the pixel node in connection with a plurality of transmission signals;

a readout operation of generating a pixel signal on based on a potential change in the pixel node corresponding to the accumulated charges in readout time periods; and an output operation of outputting the pixel signal in connection with a plurality of selection signals, wherein the controller generates the light control signal such that the light is generated at least once in the accumulation time period of a first pixel group, and is generated at least once in the accumulation time period of a last pixel group, wherein the controller generates the light control signal in connection with the vertical synchronization signal, and wherein the controller generates the light control signal comprising a first pulse deactivated not to generate the light at a point of time when the vertical synchronization signal is activated, and a second pulse deactivated not to generate the light at a point of time when the vertical synchronization signal is deactivated.

* * * * *